US008535188B2

United States Patent
Tangl

(10) Patent No.: US 8,535,188 B2
(45) Date of Patent: Sep. 17, 2013

(54) HYBRID DRIVE TRAIN FOR A MOTOR VEHICLE

(75) Inventor: Ferdinand Tangl, Hart (AT)

(73) Assignee: Magna Steyr Fahrzeugtechnik AG & Co KG, Graz (AT)

( * ) Notice: Subject to any disclaimer, the term of this patent is extended or adjusted under 35 U.S.C. 154(b) by 238 days.

(21) Appl. No.: 13/003,184

(22) PCT Filed: Jul. 9, 2009

(86) PCT No.: PCT/EP2009/058760
§ 371 (c)(1),
(2), (4) Date: Feb. 17, 2011

(87) PCT Pub. No.: WO2010/004007
PCT Pub. Date: Jan. 14, 2010

(65) Prior Publication Data
US 2011/0143874 A1   Jun. 16, 2011

(30) Foreign Application Priority Data
Jul. 9, 2008   (DE) .......................... 10 2008 032 320

(51) Int. Cl.
*F16H 3/72* (2006.01)
*F16H 37/06* (2006.01)
(52) U.S. Cl.
USPC ............................................................ 475/5
(58) Field of Classification Search
USPC ................. 475/5, 51, 52, 198, 207, 209, 218;
477/2, 3, 6–8; 903/902, 906, 910; 180/65.21,
180/65.6, 235, 275
See application file for complete search history.

(56) References Cited

U.S. PATENT DOCUMENTS

| 5,856,709 | A | 1/1999 | Ibaraki et al. | |
| 6,645,105 | B2 * | 11/2003 | Kima | 475/5 |
| 7,086,977 | B2 * | 8/2006 | Supina et al. | 475/5 |
| 7,128,677 | B2 * | 10/2006 | Supina et al. | 475/5 |
| 8,075,436 | B2 * | 12/2011 | Bachmann | 475/5 |
| 2003/0166429 | A1 | 9/2003 | Tumback | |

(Continued)

FOREIGN PATENT DOCUMENTS

| DE | 19849156 A1 | 9/1999 |
| DE | 102005048938 A1 | 4/2007 |

(Continued)

OTHER PUBLICATIONS

Chinese Office Action for 200980135147.9.

*Primary Examiner* — Justin Holmes
(74) *Attorney, Agent, or Firm* — Bachman & LaPointe, P.C.

(57) ABSTRACT

The invention relates to a hybrid drive train (1) of a vehicle, comprising a drive system having an internal combustion engine (3) and a first electric supplementary drive unit (8) as well as a transmission arranged downstream of the drive system for controllably distributing the rotational speed and the torque of the drive power of the drive system to an output shaft, wherein the transmission includes a first and a second gearbox unit (11, 21) and a planetary gearing (5) having four components, namely a planet element, a planet carrier and two gears engaging with the planet element, and wherein further the internal combustion engine (3) can be coupled to the output shaft via a direct power path, by bypassing the first electric supplementary drive unit (8), through several mechanical gears of the first and/or second gearbox, wherein for this the first gearbox includes a first coupling means (12) and the second gearbox (21) includes a second coupling means (20).

17 Claims, 1 Drawing Sheet

(56) References Cited

U.S. PATENT DOCUMENTS

| | | |
|---|---|---|
| 2005/0072256 A1 | 4/2005 | Ibamoto et al. |
| 2005/0252703 A1* | 11/2005 | Schmidt et al. .............. 180/65.2 |
| 2010/0009805 A1 | 1/2010 | Bachmann |
| 2010/0216584 A1 | 8/2010 | Lutoslawski |
| 2010/0282531 A1 | 11/2010 | Janssen |

FOREIGN PATENT DOCUMENTS

| | | |
|---|---|---|
| DE | 102006059591 A1 | 6/2008 |
| WO | 01/83249 A2 | 11/2001 |
| WO | 2007/042109 A1 | 4/2007 |
| WO | 2008/046185 A1 | 4/2008 |
| WO | 2009/086846 A1 | 7/2009 |

* cited by examiner

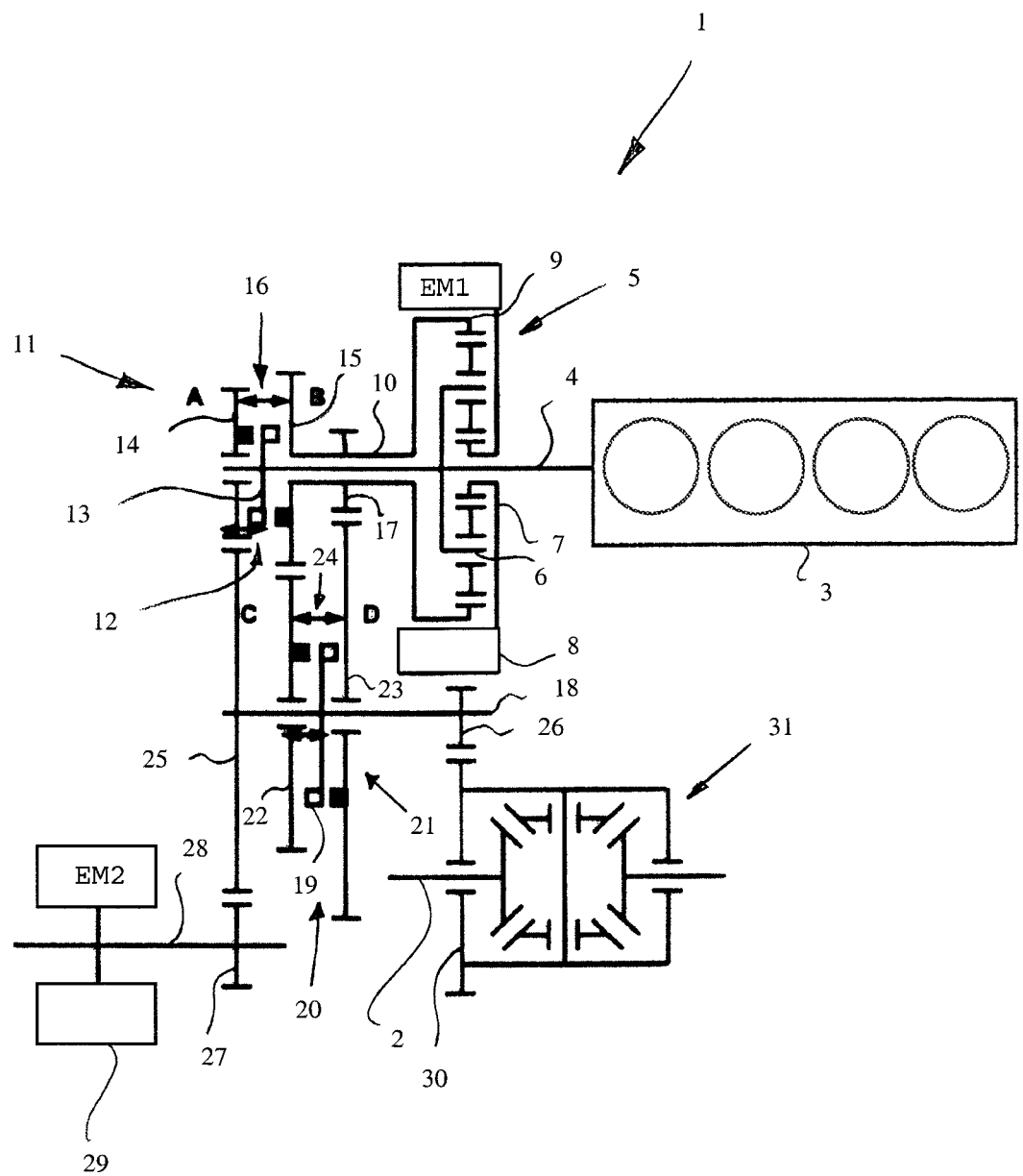

HYBRID DRIVE TRAIN FOR A MOTOR VEHICLE

BACKGROUND OF THE INVENTION

1. Field of the Invention

The invention relates to a hybrid drive train of a vehicle, especially a motor vehicle, comprising a drive system having an internal combustion engine and a first electric supplementary drive unit as well as a transmission arranged downstream of the drive system for controllably distributing the rotational speed and the torque of the drive power to an output shaft.

2. Description of the Background Art

Various designs of such hybrid drive trains are known from the prior art.

The solutions known from the prior art are characterized by a high requirement of electrical energy and necessitate electric motors having correspondingly high electrical power. Consequently, the efficiency of such transmission systems is low.

SUMMARY OF THE INVENTION

It is an object of the present invention to develop a hybrid drive train characterized by higher efficiency and thus lower fuel consumption.

This object is achieved by a hybrid drive train of a vehicle comprising a drive system having an internal combustion engine and a first electric supplementary drive unit as well as a transmission arranged downstream of said drive system for controllably distributing a rotational speed and a torque of a drive power of said drive system to an output shaft, wherein said transmission includes a sequence of several gear steps which can be engaged and/or disengaged, said gear steps having a stepwise and increasing gear ratio with first and second gearbox units, as well as a planetary gearing having four components, namely a planet element, a planet carrier and two gears engaging with said planet element, wherein a first one of said three components is connected operatively to said internal combustion engine, a second one of said three components is operatively connected to said first electric supplementary drive unit and a third one of said three components is operatively connected to at least one of said first and second gearbox units, and wherein further said internal combustion engine can be coupled to said output shaft via a direct power path, by bypassing said first electric supplementary drive unit, through several mechanical gears of said at least one of said first and second gearbox units, wherein said first gearbox unit includes first coupling means and said second gearbox unit includes second coupling means, and wherein said internal combustion engine is connected to a first gear step for starting said vehicle through an output of said planetary gearing, said output having a variable increasing and/or decreasing gear ratio.

According to various embodiments of the invention, the planetary gearing can be used in various designs. For example, the planetary gearing can have a structure comprising a sun gear, various planetary gears arranged at a planetary carrier and an annular gear. According to another possible embodiment, the planetary gearing can, for example, have two sun gears and two annular gears, each being in connection with a planetary carrier and so-called double planetary gears.

According to a special embodiment of the hybrid drive train of the invention, the hybrid drive train in several operating points enables a direct mechanical through-drive of the internal combustion engine to the output shaft or the axle to be driven. Since in such operating points no electrical power shift, i.e. no conversion of mechanical energy into electrical energy, takes place, very high efficiency can be achieved, similarly to the case of conventional, especially purely mechanical transmissions.

According to a special embodiment of the hybrid drive train of the invention, the hybrid drive train enables optimal exploitation of the operating points of the internal combustion engine by correspondingly controlling the used transmission. Therein the transmission is controlled such that the rotational speed of the transmission and/or the load acting back onto the internal combustion engine are adapted to the optimal operating points of the internal combustion engine.

According to a special embodiment of the hybrid drive train of the invention, a reduction of the fuel consumption is enabled by operating the drive systems in their optimal or at least optimized operating points, thus in operating points of the drive system guaranteeing high efficiency. Therein the optimal operating point of the drive system is of course dependent on the optimal operating points of the components of the drive system.

Therein, for example, during operation of a vehicle within the city, the hybrid drive train is operated such that the output shaft is operated either by one of the electric supplementary drive units of the drive system, in the sense of electrical driving, or by a direct through-drive of the internal combustion engine, in the sense of a direct mechanical gear. In the case of driving across the country, however, a particularly efficient operation of the hybrid drive train can be guaranteed by a direct through-drive of the internal combustion engine (direct gear), which is, where appropriate, supplemented by rising and/or lowering the load point, adjusted by the transmission, and/or adapting the rotational speed.

According to another special embodiment, the hybrid drive training of the invention proves to be particularly cost-effective, since a starting clutch can be dispensed with.

According to a special embodiment of the hybrid drive train, the internal combustion engine is connected via the direct power path to at least one gear step of the transmission having an even number in the sequence of the gear steps fixedly against rotation and in an inseparable manner from the internal combustion engine, where applicable, through a dual mass flywheel.

According to another embodiment of the hybrid drive train, the internal combustion engine is connected via the direct power path to at least one gear step of the transmission having an even number in the sequence of the gear steps without any starting clutch, in particular friction clutch, connected therebetween.

According to a special embodiment, the hybrid drive train of the invention proves to be especially cost-effective since, by using electric supplementary drive units, a smaller internal combustion engine, thus an internal combustion engine with less power, can be used. By this measure the weight of the drive system can be reduced further.

According to a special embodiment, the hybrid drive train of the invention proves to be especially cost-effective, since the function of a starter and the function of a generator can be integrated into the transmission.

According to a special embodiment of the invention, the first and the second gearbox unit can be operated independently of one another.

According to a special embodiment of the invention, the first gearbox unit is adapted for shifting between a first neutral position, a first short gear ratio and a first long gear ratio and the second gearbox unit is adapted for shifting between a second neutral position, a second short gear ratio and a second long gear ratio.

According to a special embodiment of the invention, the third component of the planetary gearing is, on the one hand, coupled to the first short and/or first long gear ratio and, on the other hand, to the second short and/or second long gear ratio.

According to a special embodiment of the invention, the first and/or second coupling means is/are designed as a positively locking coupling means, especially as a claw coupling.

According to a special embodiment of the hybrid drive train of the invention, synchronization of the various gears of the transmission is effected by an electric supplementary drive unit, especially the first electric supplementary drive unit. By this measure, the coupling means can be designed as simple claw couplings. According to another embodiment, however, synchronized couplings can be used for one or several of the coupling means.

According to a special embodiment of the invention, the first electric supplementary drive unit is connected operatively to a first one of the two gears of the planetary gearing, especially the sun gear, the internal combustion engine operatively to the planetary carrier of the planetary gearing and the first and the second gearbox unit operatively to a second one of the two gears of the planetary gearing, especially the annular gear.

According to a special embodiment of the invention, there is provided a second electric supplementary drive unit which is connected through the first and/or second gearbox unit to the planetary gearing and via a direct mechanical power path to the output shaft.

According to a special embodiment of the invention, the first and/or second electric supplementary drive unit(s) is/are adapted to be operated as a generator.

According to a special embodiment of the invention, the direct power path of the internal combustion engine is connected directly to the first gearbox by bypassing the planetary gearing.

The object of the invention is further achieved by a method of operating a hybrid drive train of a vehicle comprising a drive system having an internal combustion engine and a first electric supplementary drive unit as well as a transmission arranged downstream of said drive system for controllably distributing a rotational speed and a torque of a drive power to an output shaft, wherein said transmission includes a sequence of several gear steps which can be engaged and/or disengaged, the gear steps having a stepwise and increasing gear ratio with first and second gearbox units, as well as a planetary gearing having four components, namely a planet element, a planet carrier and two gears engaging with said planet element, and wherein a first one of said three components is connected operatively to said internal combustion engine, a second one of said three components is operatively connected to said first electric supplementary drive unit and a third one of said three components is operatively connected to at least one of said first and second gearbox units, and wherein further said internal combustion engine is coupled to said output shaft via a direct power path, by bypassing said first electric supplementary drive unit, through said first and said second gearbox units, wherein said first gearbox includes first coupling means and said second gearbox includes second coupling means so that a direct mechanical through-drive of said internal combustion engine through said first and/or said second gearbox in several mechanical gears is enabled, and said internal combustion engine is connected to said first gear step for starting said vehicle through an output of said planetary gearing having a variable increasing and/or decreasing gear ratio.

According to a special embodiment of the method of the invention, the internal combustion engine is connected via the direct power path to at least one gear step of the transmission having an even number in the sequence of the gear steps fixedly against rotation and in an inseparable manner from the internal combustion engine, where applicable, through a dual mass flywheel.

According to another embodiment of the method of the invention, the internal combustion engine is connected via the direct power path to at least one gear step of the transmission having an even number in the sequence of the gear steps without any starting clutch, in particular friction clutch, connected therebetween.

According to a special embodiment of the invention, a torque which is at least partially introduced by the internal combustion engine is distributed through the first electric supplementary drive unit and the third component between several mechanical gears engaged in parallel by the gearboxes.

According to a special embodiment of the invention, synchronization of the first and/or the second gearbox is effected through the first electric supplementary drive unit and the third component.

According to a special embodiment of the invention, the direct power path is adapted depending on the mechanical gear chosen through the first and/or second gearbox.

According to a special embodiment of the invention, the internal combustion engine is connected operatively to the input member of the first coupling means directly, i.e. by bypassing the planetary gearing.

According to a special embodiment of the invention, the first and/or the second gearbox unit(s) is/are adapted for shifting between a neutral position, a first gear ratio and a second gear ratio.

BRIEF DESCRIPTION OF THE DRAWINGS

Exemplary embodiments of the invention are hereinafter explained in more detail by way of drawings in which FIG. 1 schematically shows a functional sketch of a possible arrangement of the hybrid drive train according to the invention.

DETAILED DESCRIPTION OF THE INVENTION

FIG. 1 shows a preferred embodiment of the hybrid drive train of a vehicle comprising a drive system 1 having an internal combustion engine 3 arranged in traverse direction. In this connection it shall be assumed that an output shaft 2 is oriented in parallel to the drive axis of the vehicle and that the arrangement of the internal combustion engine 3 in traverse direction is related to the longitudinal axis (not shown) of the vehicle. The internal combustion engine 3 is coupled by means of an engine output shaft 4 to a planetary gearing 5 such that the engine output shaft 4 is connected fixedly against rotation to the planetary carrier 6 of the planetary gearing 5. The sun gear 7 of the planetary gearing 5 is connected to a first electric supplementary drive unit 8 (EM1) which is embodied as an electric motor or as an electric motor/generator and thus can be used for delivering mechanical power, especially a torque, as well as for generating electrical energy. The annular gear 9 of the planetary gearing 5 is connected through a first transmission shaft 10 to a first gearbox unit 11 having a first coupling means 12. The first coupling means 12 itself is embodied as a claw coupling having a first input member 13, a first output member 14 with short gear ratio and a first output member 15 with long gear ratio. For this, the first input member 13, for example, has corresponding claws on two sides, wherein a positively locking contact of the claws on the input member 13 with the corresponding claws on the first output member 14 with short gear ratio or the corresponding claws on the first output member 15 with long gear ratio can be made by shifting the input member 13. Further, a neutral position 16 of the input member 14 between the two first output members 14, 15 is possible without making a positively locking contact; incidentally, this neutral position is shown in FIG. 1.

As can be further seen from FIG. 1, the engine output shaft 4 is coupled to the first input member 13 fixedly against rotation. In contrast thereto, the first output member 14 with short gear ratio is supported in a rotatable manner on the engine output shaft 4, and the first output member 15 with long gear ratio is connected fixedly against rotation to the first transmission shaft 10 and through the latter to the annular gear 9 of the planetary gearing. 5. The first output member 14 with short gear ratio and the first output member 15 with long gear ratio are each embodied as gears, especially as spur wheels. Further there is provided another first gear, especially spur wheel, 17 which is connected fixedly against rotation to the first transmission shaft 10 and through the latter fixedly against rotation to the annular gear 9 of the planetary gearing 5.

According to other exemplary embodiments, varying arrangements of the drive members and the driven members, respectively, are possible. For example, according to another embodiment, the internal combustion engine is connected operatively to the annular gear 9, and the first gearbox unit 11 is connected operatively through the first transmission shaft 10 to the planetary carrier 6 of the planetary gearing 5. Accordingly, the first electric supplementary drive unit 8 would be coupled operatively to the sun gear 7 of the planetary gearing 5.

As can be seen from FIG. 1, there is provided a second transmission shaft 18 which is connected fixedly against rotation to a second input member 19 of a second coupling means 20 of a second gearbox unit 21.

The second coupling means 20 is also embodied as a claw coupling and has a second output member 22 with long gear ratio and a second output member 23 with short gear ratio, in addition to the second input member 19. For this, the second input member 19 has corresponding claws on two (both) sides, which serve to make a positively locking contact to the corresponding claws on the second output member 22 with long gear ratio or the second output member 23 with short gear ratio by shifting the second input member 19. Further, a neutral position 24 of the second input member 19 between the two second output members 22, 23 is possible without a corresponding positively locking contact to one of the two output members. Incidentally, this neutral position 24 is shown in FIG. 1.

As can be further seen from FIG. 1, the second transmission shaft 18 is connected fixedly against rotation to the second input member 19, whereas the second output member 22 with long gear ratio and the second output member 23 with short gear ratio are supported on the second transmission shaft 18 in a rotatable manner. The second output member 22 with long gear ratio and the second output member 23 with short gear ratio are each embodied as gears, especially spur wheels. Further, there is provided a second gear 25, especially spur wheel, as well as a third gear 26, especially spur wheel, which are both connected fixedly against rotation to the second transmission shaft 18.

A second electric supplementary drive unit 29 is coupled to the second transmission shaft 18 through the second gear 25 via a fourth gear 27, especially spur wheel, and through a third transmission shaft 28. On the opposite side, the second transmission shaft 18 is connected to the third gear 26 and a fifth gear 30, especially spur wheel, to the output shaft 2. The output shaft 2 is, for example, embodied as a part of a differential 31, as shown.

According to a special embodiment of the invention, there can be provided a flywheel, for example, a dual mass flywheel, as disclosed in U.S. Pat. No. 5,856,709 between the internal combustion engine and the planetary gearing.

The following table illustrates the various operational modes of the hybrid drive train according to FIG. 1:

| Operating Mode | Coupling 1 | | | Coupling 2 | | | Description |
|---|---|---|---|---|---|---|---|
| | A | N | B | C | N | D | |
| 1. | X | | | X | | | 2nd and $3^{rd}$ gear engaged. Torque can be distributed at will to the $2^{nd}$ or $3^{rd}$ gear through additional drive 1. |
| 2. | X | | | | X | | ICE - driving in $2^{nd}$ gear. $1^{st}$ or $3^{rd}$ gear can be brought to synchronous rotational speed through additional drive 1 and subsequently be engaged. |
| 3. | X | | | | | X | $2^{nd}$ and $1^{st}$ gear engaged. Torque can be distributed at will to the $2^{nd}$ or $1^{st}$ gear through additional drive 1. |
| 4. | | X | | X | | | Driving in $3^{rd}$ gear with adaptation ICE - rotational speed through EM 1. |
| 5. | | X | | | | X | Electrical driving through EM 2. |
| 6. | | X | | | | X | Starting (IVT function). Driving in $1^{st}$ gear with adaptation ICE - rotational speed through EM1. |
| 7. | | | X | X | | | Driving with ICE in $3^{rd}$ gear, rigid through-drive in upper speed range ("highway mode") |
| 8. | | | X | | | X | Electrical driving through EM 2, additionally optionally Starting engine or generating current by ICE and EM1 Reverse gear (electric) |
| 9. | | | X | | | X | Driving with ICE in $1^{st}$ gear, rigid through-drive in lower speed range ("city mode") |

As illustrated in Table 1 in detail, the design of the invention according to FIG. 1 allows nine different operational modes.

In a first operational mode, the first input member 13 of the first coupling means 12, through disengagement, is coupled to the first output member 14 with short gear ratio and the second input member 19 of the second coupling means 20, through disengagement, is coupled to the second output member 22 with long gear ratio.

In the first operational mode, according to an embodiment of a design of the transmission, the second and the third gear of the transmission are engaged. By correspondingly choosing the torque at the first electric supplementary drive unit 8 and by distributing the torque and/or the power through the planetary gearing 5, the drive torque can be shifted at will to the $2^{nd}$ or $3^{rd}$ gear, which enables disengagement of the respective unloaded gear and enables the transmission to be operated either in the $2^{nd}$ or in the $3^{rd}$ gear. This shift position will thus primarily occur temporarily during shifting from the $2^{nd}$ to the $3^{rd}$ gear or from the $3^{rd}$ to the $2^{nd}$ gear. In contrast to a purely mechanical double clutch transmission, in the shown embodiment, due to a combined mechanical and electric power distribution, there is no traction force interruption when shifting between the gears.

In the first operational mode, a so-called rigid mechanical through-drive of the internal combustion engine 3 to the output shaft 2 is possible via the $2^{nd}$ gear, which minimizes the power losses and enables a particularly efficient operation of the hybrid drive train. If, during engagement of the $2^{nd}$ gear, no support torque is applied through the first electric supplementary drive unit 8, the $3^{rd}$ gear which is also engaged runs along without load in the transmission and does not cause any nameable power losses. In this configuration, the first operational mode functionally corresponds to the second operational mode (see discussion thereof in the following). In the case of a rigid through-drive the full power of the internal combustion engine can be transferred mechanically, thus without electrical power branching. The term power branching in this context is in particular understood to be the conversion of a portion of the mechanical energy into electrical energy as well as a subsequent back conversion of at least a portion of this electrical energy into mechanical energy. Therein such a back conversion can take place with a time shift, for example, by temporarily storing the electrical energy in an energy storage, especially in a battery. In the course of the electrical power branching, a portion of the drive energy from the drive system is lost, in particular through a conversion in heat energy.

In a second operational mode, the first input member 13 of the first coupling means 12, through a corresponding disengagement, is coupled to the output member 14 with short gear ratio and the second input member 19 is positioned in its neutral position 24. In the second operational mode, the transmission is in this way operated in the $2^{nd}$ gear. In the second operational mode, the hybrid drive train has a so-called rigid mechanical through-drive of the internal combustion engine 3 to the output shaft 2, not causing any electrical power losses to occur and thus enabling an especially efficient operation of the hybrid drive drain.

According to another special embodiment of the device of the invention, in the case of a change from an even-numbered to an odd-numbered gear step the odd-numbered gear can be synchronized in a simple and efficient manner. For example, starting from the second operational mode, i.e. from the $2^{nd}$ gear, the $3^{rd}$ gear can be synchronized through the first operational mode and be subsequently engaged. For this, equality of rotational speeds between the second output member 22 with long gear ratio and the second input member 19 is effected through the first electric supplementary drive unit 8. Therein the first electric supplementary drive unit 8 impresses a rotational speed onto the second output member 22 through the planetary gearing 5, the first transmission shaft 10 and the first output member 15 with long gear ratio, wherein the rotational speed corresponds to the momentary rotational speed of the second transmission shaft 18. After this synchronization the second coupling means 20 between the second output member 22 with long gear ratio and the second input member 19 is closed, effecting a transfer to the first operational mode. By building up a corresponding torque at the electric supplementary drive unit 8 and relieving the first coupling means, the $2^{nd}$ gear can in turn be disengaged without traction force interruption by disengaging the first input member 13 into the neutral position 16 of the first coupling means 12. With this, a transfer to a fourth operational mode (cf. also the following explanations relating to the fourth operational mode) and an operation of the transmission in the $3^{rd}$ gear is effected.

In a third operational mode of the transmission, corresponding to the design of the transmission, simultaneously the second and the first gear of the transmission are engaged. By correspondingly choosing the torque at the first electric supplementary drive unit 8, the drive torque can be shifted at will to the $2^{nd}$ or the $1^{st}$ gear, which enables disengagement of the respective unloaded gear. The third operational mode will primarily occur during shifting between the $1^{st}$ and the $2^{nd}$ gear. In the third operational mode a direct mechanical through-drive of the internal combustion engine to the output is possible via the $2^{nd}$ gear.

In a fourth operational mode, the first input member 13 is in the neutral position 16. The second input member 19, by correspondingly disengaging the second coupling means 20, is coupled to the second output member 22 with long gear ratio. This enables driving in the $3^{rd}$ gear of the transmission. In the fourth operational mode, transfer of the power is effected by a support through the first electric supplementary drive unit 8. In this way, also adaptation of the rotational speed of the internal combustion engine 3 to the desired output rotational speed of the drive train can be effected through the first electric supplementary drive unit 8. According to a special embodiment, due to the geometrical correlations of the chosen planetary gear train, there is, for a predetermined output rotational speed, a linear correlation between the rotational speed of the internal combustion engine and the first electric supplementary drive unit 8. Thus, for a predetermined output rotational speed, each rotational speed of the internal combustion engine is assigned to a rotational speed of the first electric supplementary drive unit 8. The possible combinations of rotational speeds are, on the one hand, limited by the ceiling speeds as well as, on the other hand, by the possible maximal powers of the respective drive units.

In a fifth operational mode, the first input member 13 is positioned in the neutral position 16 and the second input member 19 in its neutral position 24. In the fifth operational mode, electrical driving of the vehicle or electrical operation of the hybrid drive train and/or operation of the transmission as an electric reverse gear is possible. For this, driving is effected through the second electric (supplementary) drive unit 29. The energy for operating the second electric supplementary unit, for example, for "purely" electrical driving is provided from an energy storage, especially a suitable battery (not shown).

In a sixth operational mode, the first input member 13 is in the neutral position 16. The second input member 19 of the second coupling means 20, through a corresponding disengagement, is coupled to the second output member 23 with short gear ratio.

According to a special embodiment of the subject-matter of the invention, starting the vehicle without clutch is possible in the sixth operational mode. While the internal combustion engine is running, the output is standing still as well as the first gear is engaged, a rotational speed is forced upon the first electric supplementary drive unit 8, especially the electric motor/generator unit (EM1). By retarding the first electric supplementary drive unit 8 (EM1), for example, by operating the first electric supplementary drive unit 8 (EM1) in generator operation, the torque at the first transmission shaft 10 (transmission input shaft to the $1^{st}$ gear) increases, whereby starting without clutch can be realized.

In order to increase the starting torque, the second electric supplementary drive unit 29 can be used, which may, for example, be operated with the electrical energy gained at the first electric supplementary drive unit 8. In this way an additional starting torque produced by the second electric supplementary drive unit 29 can be provided for starting the vehicle. Therein, for example, the energy produced by the electric supplementary drive unit 8 in generator operation can be supplied to the second electric supplementary drive unit 29. In the sixth operational mode, corresponding to the design of the transmission, the first gear of the transmission is engaged.

According to an embodiment, in the sixth operational mode an adaptation of the rotational speed of the internal combustion engine 3 through the first electric supplementary drive unit 8 is possible.

In a seventh operational mode, the first input member 13 of the first coupling means 12, through a corresponding disengagement, is coupled through the output member 15 with long gear ratio to the transmission shaft 10, wherein the planetary gear train is blocked and the electric supplementary drive unit 8 is coupled directly to the internal combustion engine 3. Further, the second input member 19 of the second coupling means 20, through a corresponding disengagement, is coupled to the second output member 22 with long gear ratio. In the seventh operational mode, the hybrid drive train has a so-called rigid through-drive of the internal combustion engine 3 to the output shaft 2 in the $3^{rd}$ gear, minimizing the power losses and enabling an especially efficient operation of the hybrid drive train. In the seventh operational mode, corresponding to the design of the transmission, the third gear of the transmission is engaged and a rigid through-drive in the upper speed range ("highway mode") is realized.

In the eighth operational mode, the first input member 13 of the first coupling means 12, through a corresponding disengagement, is coupled through the output member 15 with long gear ratio to the first transmission shaft 10, wherein the planetary gear train is blocked by connecting the annular gear and the planetary carrier and thus the electric supplementary drive unit 8 is coupled directly to the internal combustion engine 3. Further, the second input member 19 is positioned in its neutral position 24.

In the eighth operational mode, on the one hand, electrical driving through the second electric supplementary drive unit 29 and/or starting the internal combustion engine 3 and/or generating electrical energy through coaction of the internal combustion engine 3 and the first electric supplementary drive unit 8 and/or realizing an electric reverse gear is possible.

According to a special embodiment of the present invention, in order to start the internal combustion engine 3, the planetary gearing 5 is locked or blocked such that the internal combustion engine can be started through the first electric supplementary drive unit 8 (EM1). Therein the annular gear 9, through the shift position of the first coupling means 12, is connected rigidly to the planetary carrier 6, and the planetary gearing train 5 is thus blocked. Subsequently, the first electric supplementary drive unit 8 (EM1) is brought to rotational speed, wherein the first electric supplementary drive unit 8 rotates and starts the internal combustion engine 3.

According to a special embodiment of the present invention, the reverse or return gear is enabled by electric motor operation through the second electric supplementary drive unit 29 (EM2). Therein the second electric supplementary drive unit 29 is operated by engine operation with the corresponding rotational direction. The energy for the operation is either provided from an energy storage or, in case the planetary gearing 5 is locked, by operating the first electric supplementary drive unit 8 (EM1) as a generator driven by the internal combustion engine 3.

In a ninth operational mode, the first input member 13 of the first coupling means 12, through a corresponding disengagement, is coupled through the output member 15 with long gear ratio to the first transmission shaft 10 and the second input member 19 of the second coupling means 20, through a corresponding disengagement, to the second output member 23 with short gear ratio. Thus, the planetary gear train 5 is blocked by connecting the annular gear and the planetary carrier, i.e. the first electric supplementary drive unit 8 is coupled fixedly to the internal combustion engine 8.

In the ninth operational mode, the hybrid drive train has a so-called rigid through-drive of the internal combustion engine 3 to the output shaft 2, minimizing the power losses and enabling an especially efficient operation of the hybrid drive train. In the ninth operational mode, corresponding to the design of the transmission, the first gear of the transmission is engaged and thus a rigid through-drive in the lower speed range ("city mode") is realized.

In various operational modes, the first and/or second electric supplementary drive unit(s) 8, 29 enable(s) boosting (supporting the internal combustion engine 3) as well as recuperation, i.e. recovering of electrical energy if at least one of the electric supplementary drive units 8, 29 is operated as a generator. Such boosting or recuperation is possible in all operational modes with the exception of the fifth operational mode.

During boosting, additional torque is introduced through the first or the second electric drive unit 8, 29. Therein, the additional torque can be introduced in all 9 operational modes through the second electric supplementary drive unit 29. This is only possible through the first electric supplementary drive unit 8 if the planetary gear train 5 is closed, i.e. 2 members of the planetary gear train are connected; otherwise, with the exception of operational modes having a direct mechanical through-drive, the first electric supplementary drive unit 8 is required for supporting the internal combustion engine 3. During recuperation the first and/or second electric drive unit(s) 8, 29 is/are driven by the internal combustion engine 3.

According to a special embodiment of the hybrid drive train, for example, the rotational speeds of the first electric supplementary drive unit 8 and the internal combustion engine 3 are predetermined by the chosen shift position or the chosen gear and the driving speed of a vehicle. Consequently, the power of the electric supplementary drive unit 8, depending on the required power of the internal combustion engine 3, is also predetermined and the electric supplementary drive unit 8 in this gear or in this operational mode cannot at will be used for boosting and/or recuperating the torque or the power. Thus, as described above, depending on the driving state, a predetermined power is taken up by the electric supplementary drive unit 8 in motor operation or delivered in generator operation and thus extracted from and/or supplied to either the second electric supplementary drive unit 29 ("electrical power path") or an electrical energy storages (not shown), especially a battery.

According to a special embodiment of the invention, the hybrid drive train of the invention has a planetary gearing 5 having an electric motor 8 arranged at the sun gear 7 of the planetary gearing, wherein the electric motor can be used as starting element and/or for synchronizing the gearbox units 11, 21 of the hybrid drive train, especially of the various gear steps of the gearbox units 11, 21 and/or for varying/adapting the rotational speed of the internal combustion engine 3 in the case of certain gears, especially in the case of odd-numbered gears.

According to a special embodiment of the device of the invention, the transmission structure of the hybrid drive train has two independent load paths. This enables shifting without traction force interruption.

According to a special embodiment of the invention, the second electric supplementary drive unit 29 is connected fixedly against rotation to the output. An arrangement as shown in FIG. 1 appears to be favourable with respect to its gear ratio, especially with regard to the construction size of the hybrid drive train and the electric motors used. Further, the embodiment shown enables electrical driving, recuperating electric energy as well as boosting, i.e. a torque increase through the supporting operation of the electric motor, in addition to the operation of the internal combustion engine 3.

According to a special embodiment of the subject-matter of the invention, synchronization of the gear steps can be effected in the case of a change of gear ratio starting from an odd-numbered gear step to an even-numbered gear step through the, especially the first, electric supplementary drive unit 8. For example, starting from the $1^{st}$ or the $3^{rd}$ gear of the transmission, the $2^{nd}$ gear can be synchronized through the first electric supplementary drive unit 8. For this, a corresponding rotational speed is set at the first electric supplementary drive unit 8, which rotational speed guarantees that there is an equality of rotational speeds at the first coupling means 12. In case there is an equality of rotational speeds, the $2^{nd}$ gear can in this way be engaged additionally to the momentary gear. After adjusting the corresponding torque at the first electric supplementary drive unit 8, a change to the $2^{nd}$ gear can be effected without traction force interruption and the additionally engaged odd-numbered gear can be disengaged.

According to a special embodiment of the present subject-matter of the invention, a direct operation of the internal combustion engine is provided. For this, 3 direct driving steps are available, in which a direct coupling of the output shaft 2 to the internal combustion engine is guaranteed. By correspondingly choosing the gear ratios, optimal efficiency of a conventional drive train can be used for relevant speed ranges. The consumption disadvantage of conventional hybrid drive trains having a high percentage of electrical power losses does not apply.

According to another embodiment of the hybrid drive train, any desired number of gears, comprising 2, 3, 4, 5, 6 or more mechanical gears, for example, can be realized by enlargement and/or reduction of the transmission through arranging additional gear pairs and/or clutch couplings.

The invention claimed is:

1. A hybrid drive train of a vehicle comprising a drive system having an internal combustion engine and a first electric supplementary drive unit as well as a transmission arranged downstream of said drive system for controllably distributing a rotational speed and a torque of a drive power of said drive system to an output shaft, wherein said transmission includes a sequence of several gear steps which can be engaged and/or disengaged, said gear steps having a stepwise and increasing gear ratio with first and second gearbox units, as well as a planetary gearing having four components, namely a planet element, a planet carrier and two gears engaging with said planet element, wherein a first one of said three components is connected operatively to said internal combustion engine, a second one of said three components is operatively connected to said first electric supplementary drive unit and a third one of said three components is operatively connected to at least one of said first and second gearbox units, and wherein further said internal combustion engine can be coupled to said output shaft via a direct power path, by bypassing said first electric supplementary drive unit, through several mechanical gears of said at least one of said first and second gearbox units, wherein said first gearbox unit includes first coupling means and said second gearbox unit includes second coupling means, and wherein said internal combustion engine is directly connected to a first gear step for starting said vehicle through an output of said planetary gearing, said output having a variable increasing and/or decreasing gear ratio.

2. The hybrid drive train according to claim 1, wherein said internal combustion engine is connected via said direct power path to at least one gear step of said transmission having an even number in said sequence of said gear steps fixedly against rotation and in an inseparable manner from said internal combustion engine, and/or without any starting clutch connected therebetween.

3. The hybrid drive train according to claim 1, wherein said first and second gearbox units can be operated independently of one another.

4. The hybrid drive train according to claim 1, wherein said first gearbox unit is adapted for shifting between a first neutral position, a first short gear ratio and a first long gear ratio and said second gearbox unit is adapted for shifting between a second neutral position, a second short gear ratio and a second long gear ratio.

5. The hybrid drive train according to claim 4, wherein said third component of said planetary gearing is, on the one hand, coupled to said first short and/or first long gear ratio and, on the other hand, to said second short and/or second long gear ratio.

6. The hybrid drive train according to claim 1, wherein at least one of said first and second coupling means is designed as a positively locking coupling means.

7. The hybrid drive train according to claim 1, wherein said first electric supplementary drive unit is connected operatively to a first one of said two gears of said planetary gearing, said internal combustion engine is operatively connected to said planetary carrier of said planetary gearing and said first and second gearbox units are operatively connected to a second one of said two gears of said planetary gearing.

8. The hybrid drive train according to claim 1, wherein said hybrid drive drain includes a second electric supplementary drive unit, thereby creating a second electric power path in addition to said mechanical power path.

9. The hybrid drive train according to claim 8, wherein said second electric supplementary drive unit is connected through said at least one of said first and second gearbox units to said planetary gearing and via a direct mechanical power path to said output shaft.

10. The hybrid drive train according to claim 8, wherein said second electric supplementary drive unit is adapted to be operated as at least one of a motor and a generator.

11. The hybrid drive train according to claim 1, wherein said first electric supplementary drive unit is adapted to be operated as at least one of a motor and a generator.

12. The hybrid drive train according to claim 1, wherein said direct power path of said internal combustion engine is connected directly to said first gearbox unit by bypassing said planetary gearing.

13. A method of operating a hybrid drive train of a vehicle comprising a drive system having an internal combustion engine and a first electric supplementary drive unit as well as a transmission arranged downstream of said drive system for controllably distributing a rotational speed and a torque of a drive power to an output shaft, wherein said transmission includes a sequence of several gear steps which can be engaged and/or disengaged, the gear steps having a stepwise and increasing gear ratio with first and second gearbox units, as well as a planetary gearing having four components, namely a planet element, a planet carrier and two gears engaging with said planet element, and wherein a first one of said three components is connected operatively to said internal combustion engine, a second one of said three components is operatively connected to said first electric supplementary drive unit and a third one of said three components is operatively connected to at least one of said first and second gearbox units, and wherein further said internal combustion engine is coupled to said output shaft via a direct power path, by bypassing said first electric supplementary drive unit, through said first and said second gearbox units, wherein said first gearbox includes first coupling means and said second gearbox includes second coupling means so that a direct mechanical through-drive of said internal combustion engine through said first and/or said second gearbox in several mechanical gears is enabled, the method comprising the step of directly connecting said internal combustion engine to said first gear step for starting said vehicle through an output of said planetary gearing having a variable increasing and/or decreasing gear ratio.

14. The method of operating a hybrid drive train according to claim 13, wherein said internal combustion engine is connected in at least one operating state via said direct power path to at least one gear step of said transmission having an even number in said sequence of said gear steps without any starting clutch connected therebetween.

15. The method of operating a hybrid drive train according to claim 13, wherein providing a torque which is at least partially introduced by said internal combustion engine is distributed through said first electric supplementary drive unit and said third component between several mechanical gears engaged in parallel by said gearbox units.

16. The method of operating a hybrid drive train according to claim 13, wherein comprising synchronizing of at least one of said first and said second gearbox units is effected through said first electric supplementary drive unit and said third component.

17. The method of operating a hybrid drive train according to claim 13, wherein providing a second electric supplementary drive unit which in at least one operating state of said hybrid drive train acts as at least one of a generator or an additional drive.

\* \* \* \* \*